United States Patent
Fukuhara et al.

(10) Patent No.: US 7,343,995 B2
(45) Date of Patent: Mar. 18, 2008

(54) AIR CARGO TRANSPORT SYSTEM

(75) Inventors: Yugo Fukuhara, Minato-ku (JP); Toru Takasu, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 80 days.

(21) Appl. No.: 10/132,741

(22) Filed: Apr. 26, 2002

(65) Prior Publication Data
US 2002/0159869 A1 Oct. 31, 2002

(30) Foreign Application Priority Data
Apr. 27, 2001 (JP) .............................. 2001-132899

(51) Int. Cl.
*B62D 1/24* (2006.01)
(52) U.S. Cl. ............. 180/168; 180/167; 414/344; 414/391; 414/398; 414/399; 340/905; 340/988; 700/229
(58) Field of Classification Search ............. 414/340, 414/345, 347, 391, 392, 393, 398, 399, 344; 244/137.1; 180/168, 167, 169; 318/568.22; 340/988, 905, 917, 931; 700/253, 255, 112, 700/113; 701/207
See application file for complete search history.

(56) References Cited
U.S. PATENT DOCUMENTS 3,935,922 A * 2/1976 Cooper et al. ............. 180/168
4,307,791 A * 12/1981 De Bruine ................. 180/168
4,777,601 A * 10/1988 Boegli ...................... 701/23
4,811,229 A * 3/1989 Wilson ...................... 701/25
4,817,750 A   4/1989 Ishida et al.
5,118,191 A * 6/1992 Hopkins .................... 356/368
5,525,884 A * 6/1996 Sugiura et al. ............ 318/587
5,801,506 A * 9/1998 Netzler ..................... 318/587
6,049,745 A * 4/2000 Douglas et al. ............ 701/23
6,129,025 A * 10/2000 Minakami et al. ....... 104/88.01
6,129,026 A * 10/2000 LeCroy .................. 104/88.01
6,341,430 B1 * 1/2002 Carstens et al. ........... 33/563

FOREIGN PATENT DOCUMENTS

EP        0 878 395 A2    11/1998

* cited by examiner

*Primary Examiner*—Peter M. Cuomo
*Assistant Examiner*—M. S Lowe
(74) *Attorney, Agent, or Firm*—Kratz, Quintos & Hanson, LLP (57) ABSTRACT

The cargo transport system according to this invention employs a tow vehicle that can automatically follow and run upon guide lines. The tow vehicle can tow cargo laden equipment such as container dollies to thereby automatically transport the air cargo. The air cargo is conveyed by an underground air cargo conveyor mechanism which has the conveyor line including the guide line installed underground to link the air cargo holding area in the airport terminal building and the aircraft parking area. Further, the system connects the loading/unloading cargo door of the aircraft and the underground loading/unloading position for the underground air cargo conveyor mechanism by an air cargo elevator.

3 Claims, 6 Drawing Sheets

AIR CARGO TRANSPORT SYSTEM

BACKGROUND OF THE INVENTION

1. Field of the invention

The present invention relates to an air cargo transport system, which transports the air cargo to the cargo holding area of the airport terminal building and aircraft parked on the tarmac parking area.

2. Description of the Related Art

Figure 7:
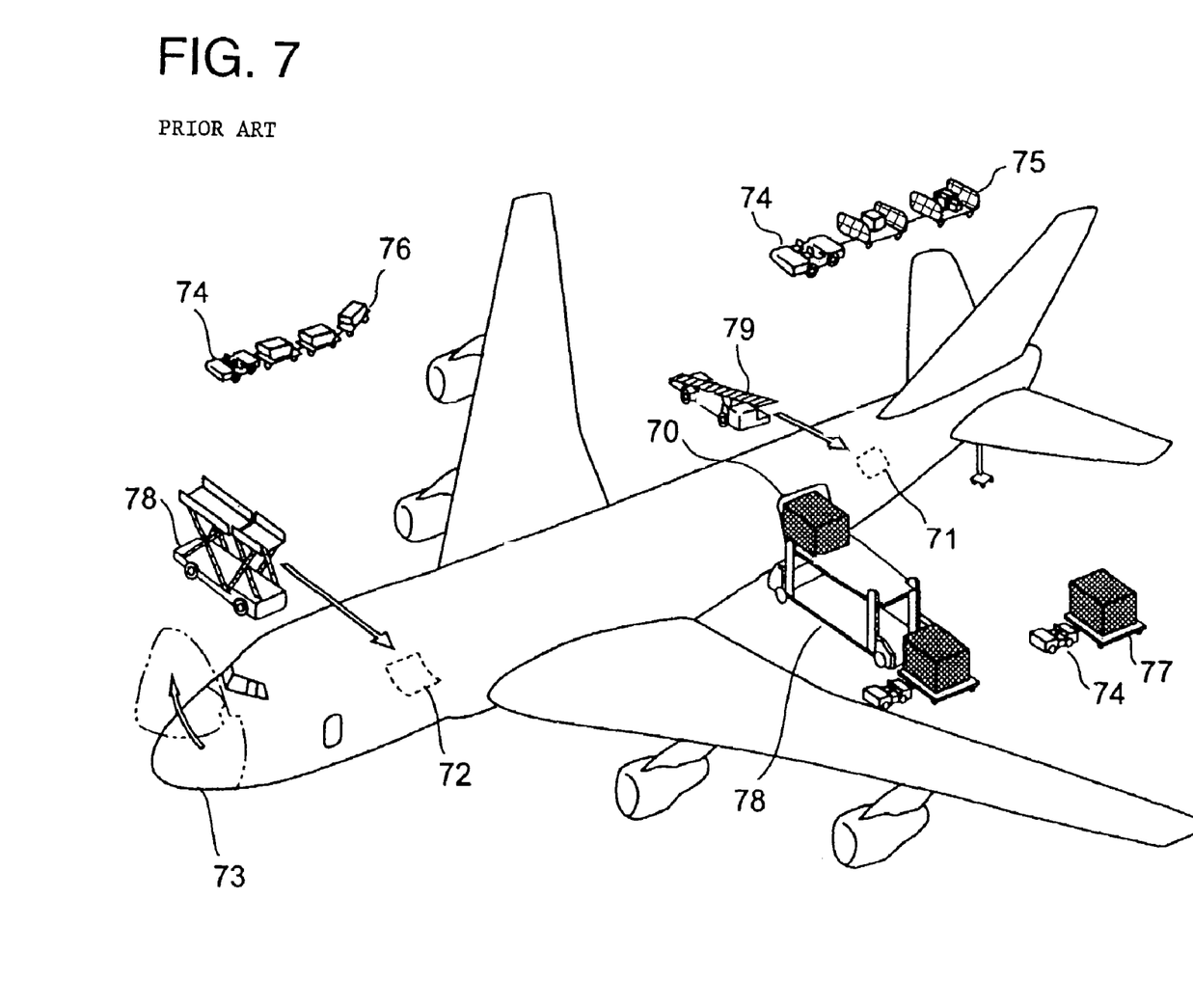
FIG. 7 is a sketch of the conventional cargo handling system according to a prior art.

Due to considerations such as the need to convey cargo into an aircraft in a short period of time, and the requirement to consider the balance of the aircraft when loading, as affected by the location of passengers, the weight of the cargo itself, etc., aircraft are normally equipped with multiple doors for loading cargo, for example, as shown in FIG. 7, the main door 70 in the center of the fuselage, the bulk door 71 in the rear of the fuselage, the lower door 72 in the front of the fuselage, and the nose door 73 at the front point of the fuselage. The transportation of the cargo stored inside of the airport terminal building to the area of the loading door is normally performed using a ramp equipment tractor 74 to tow package/cargo carts 75, lower deck container dollies 76, pallet dollies 77, etc. Further, this cargo is raised up to the loading door of the aircraft by such means as container/pallet loaders 78, self-propelled conveyor belt loaders 79, etc.

However, the required operations, such as loading the cargo onto the package/cargo carts 75, the lower deck conveyor dollies 76, the pallet dollies 77, etc; connecting these to the ramp equipment tractor 74; driving the ramp equipment tractor 74; transferring the cargo to the container/pallet loaders 78, the self-propelled conveyor belt loaders 79, etc; operating the container/pallet loaders 78 and self propelled conveyor belt loaders 79; moving the cargo into a specific place in the aircraft; all of these operations involve operating multiple types of equipments and employing numerous workers to move and convey the cargo, which are very labor intensive and entails high manpower costs. This system is also dangerous due to the possibility of accidents, such as collisions of the ramp equipment tractors as they move along the complex tarmac markings.

SUMMARY OF THE INVENTION

In view of the above-described circumstances, the objective of the present invention is to provide a transport system for air cargo which eliminates the need for numerous types of equipments and workers needed to transport the cargo, reduces manpower costs, and minimizes potential dangers such as collision by the equipment.

To resolve the problems associated with the conventional technology, the present invention, instead of using ramp equipment tractors 74 which used to be running around the tarmac parking area, employs a tow vehicle that can automatically follow and run upon guide lines. The tow vehicle can tow cargo laden equipment such as container dollies 76 and pallet dollies 77 from the cargo holding area inside of the airport terminal building to aircraft parked on the tarmac to thereby automatically transport the air cargo.

Or, as an alternative system, air cargo is conveyed by an underground air cargo conveyor mechanism which links the air cargo holding area in the airport terminal building and the aircraft parking area, and the air cargo is lifted up to the loading/unloading cargo door of the aircraft by an air cargo elevator.

This system eliminates the need for human-driven equipment, such as the conventional ramp equipment tractors, to thereby eliminate the possibility of accidents such as collisions, reduce manpower costs, and shorten the time required for loading the cargo.

Accordingly, the present invention has the following configuration. The air cargo transport system comprises guide lines which connect the air cargo holding area of the airport terminal building with the aircraft parking area on the tarmac, and auto-running tow vehicles for conveying the air cargo, which can automatically run along the guide lines. The system is characterized by the foregoing guide lines including branch marks at each branch guiding to the aircraft parking area, and stop marks which cause the auto-running tow vehicle to stop at the aircraft parking site, and by the foregoing auto-running tow vehicle being equipped with a means to read the foregoing marks and to stop at the desired aircraft parking spot to thereby automatically tow the air cargo from the air cargo holding area in the airport terminal building to the aircraft parking position.

Since the auto-running tow vehicle transports the air cargo along the guide lines that connect the air cargo holding area inside the airport terminal building to the aircraft parking area, using branch marks for each branch to a parking area and marks to stop the tow vehicle, the need in the prior art for human-driven equipment such as ramp equipment tractors is eliminated, the possibility of accidents such as equipment collisions is minimized, manpower costs are lowered, and cargo transport time is reduced.

Further, the auto-running tow vehicle has a sensor that detects obstacles in front of the vehicle, and when such a forward obstacle is detected, or when an opposing vehicle is at a branch, the vehicle is configured to automatically stop.

By employing a forward obstacle detection sensor on the auto-running tow vehicle, should there be an obstacle ahead on the guide line or should there be an oncoming vehicle at a branch in the parking area, danger is avoided by automatically bringing the vehicle to a stop to assure safety in the automatic operations.

Additionally, the present invention includes establishing an underground conveyor line that employs the foregoing guide lines that connect the air cargo holding area inside of the airport with the aircraft parking area, wherein this air cargo conveyor system is comprised of an air cargo conveyor mechanism installed underground, with the conveyor line including the aforementioned guide lines, and an air cargo elevator, which connects with the air cargo conveyor mechanism, to lift or lower the air cargo.

The foregoing air cargo elevator is characterized by being comprised of an elevator compartment, which ascends and descends from the underground loading/unloading position for the foregoing air cargo conveyor mechanism to the above ground level, and a lifting mechanism in the elevator compartment, which after the elevator compartment has been lifted, lifts up the cargo up to the cargo loading/unloading door of the aircraft to transport the air cargo that has been conveyed underground between the cargo holding area inside the foregoing airport terminal building and the aircraft parking place.

As described above, by connecting the air cargo holding area of the airport terminal building with the aircraft parked on the tarmac with an underground conveyor line, which includes the foregoing guide lines, by means of an air cargo conveyor mechanism, and further by connecting the ground level and the underground air cargo conveyor mechanism at its loading/unloading position by means of air cargo elevators, it is possible to transport the air cargo underground.

This configuration can eliminate the need for human-driven equipment such as the conventional ramp equipment tractors, prevent collisions between such equipment, reduce manpower costs and it can shorten the time required for cargo loading.

DETAILED DESCRIPTION OF THE PREFERRED EMBODIMENTS

In the following section we shall give a detailed explanation of the invention with reference to the drawings. Insofar as the size, material and shape of the components and the relative position of the components, or other features disclosed in these embodiments, they are not intended to limit the scope of the invention, but serve merely as examples to clarify the invention unless otherwise there is a specific disclosure.

Figure 1:
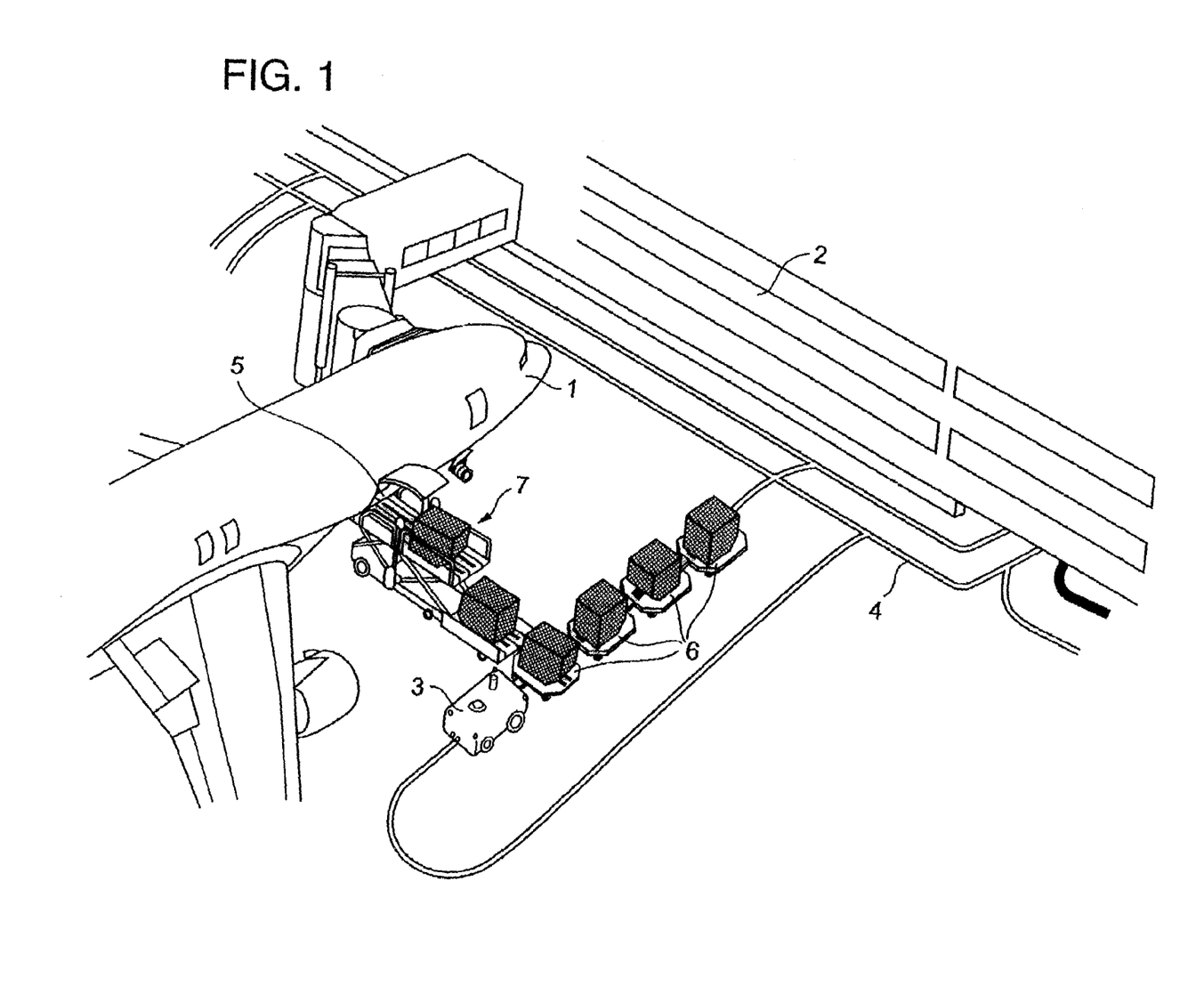
FIG. 1 shows a rough perspective drawing of the first preferred embodiment of this invention.
Figure 2:
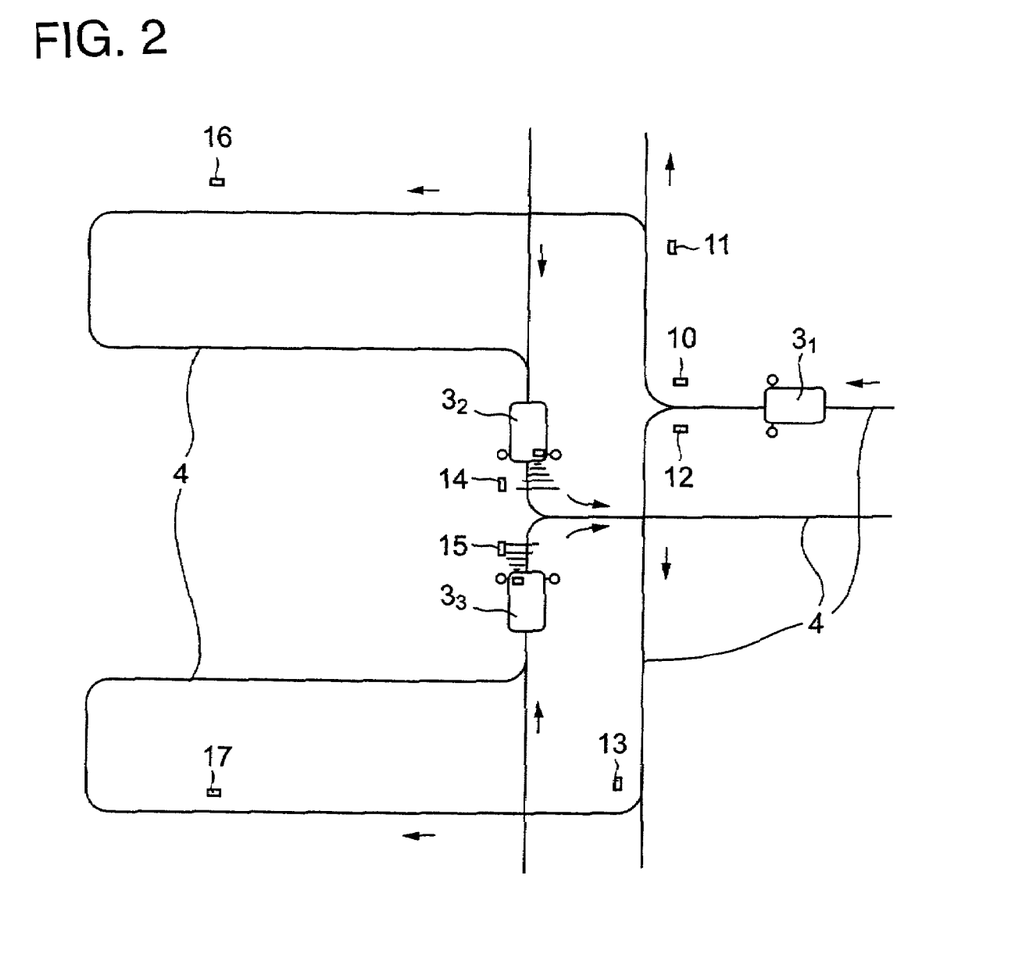
FIG. 2 shows a sketch of guide lines which drive the tow vehicle automatically according to this invention.
Figure 3:
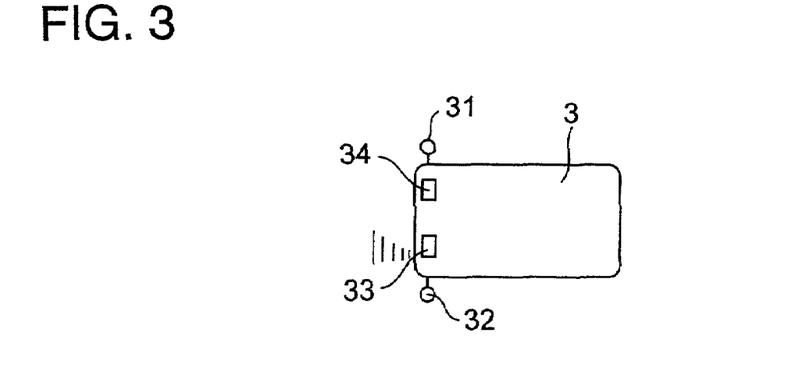
FIG. 3 shows a sketch of the mechanism of the tow vehicle according to this invention.

FIG. 1 shows a rough perspective drawing of the first preferred embodiment of this invention. FIG. 2 shows a sketch of guide lines which drive the tow vehicle automatically according to this invention. FIG. 3 shows a sketch of the mechanism of the tow vehicle according to this invention.

In the drawings, 1 is aircraft, 2 is airport terminal, 3 is auto-running tow vehicle, 4 is guide line to guide to run auto-running tow vehicle 3, 5 is a loading/unloading cargo door, 6 is container/pallet dollies which are towed by auto-running tow vehicle 3, 7 is container/pallet loader to load the air cargo transported, and lift up to the cargo door 5, 10-15 are marks which are provided at each branch of guide line 4, 16 and 17 are stop marks to stop auto-running vehicle at the aircraft parking, 31 and 32 are sensors to detect marks 10-17, 33 is sonic or electro-magnetic waves transmitter source, and 34 is sensor to detect the reflected sound or electro-magnetic waves emitted from transmitter source 33.

FIG. 1 shows a first embodiment of the present invention in which the air cargo is transported to or from the air cargo holding area of the airport terminal building 2 by towing container/pallet dollies 6 towed by auto-running tow vehicle 3 along guide lines 4. As shown in FIG. 2, this is enabled by guide lines 4 that connect between the baggage holding area of airport terminal building 2 and the aircraft parking areas, marks 10, 11, 12, 13, 14, 15 at each of the branches of guide lines 4 at the aircraft parking places, and marks 16, 17 positioned where the tow vehicle should stop. These guide lines 4 are shown in the figure as lines, however so long as they can be detected and followed by the auto-running tow vehicle 3, they are not restricted to lines, but may be infrared rays, electro-magnetic waves or the like. Further, the marks themselves may be variably comprised of, such as colored tile-like marks which appear differently from the paving or concrete inside the airport, bar code mark for indicating the location, light emitting elements for emitting infrared rays or light beams, embedded oscillators to emit electro-magnetic waves, or embedded magnets, etc.

Further, tow vehicle 3 is equipped with an optical reading detection device (not shown) on its bottom to follow sensors 31, 32 to detect the marks 10-17 provided along guide lines 4, a transmitter source 33 to emit sound or electromagnetic waves to detect obstacles ahead, and a sensor 34 to detect the reflected sound or electro-magnetic waves emitted from transmitter source 33; these components are configured to enable the bottom optical reading detection device to read guide lines 4; and additionally, sensors 31, 32 to read marks 10-15 at each branch to an aircraft parking area and to detect and stop upon stop marks 16, 17. In cases where this auto-running tow vehicle 3 is configured for electro-magnetic wave type guide lines, it would include a receiver to receive those electro-magnetic signals, and if marks 10-17 established along guide lines 4 were bar codes or infrared light or light emitting element emissions, or if they were established with embedded oscillators or magnets, appropriate sensors would be included.

Thus, according to the air cargo conveyance system constituted in this manner, when loading aircraft 1 with cargo from airport terminal building 2, air cargo is loaded upon container/pallet dollies 6 at the air cargo holding area of airport terminal building 2, and then the auto-running tow vehicle 3 tows container/pallet dollies 6 to the specified aircraft parking place based upon memorized route instructions. These instructions consist of instructions on turning right or left at the predetermined count of marks for the branches to the parking places established along the guide line 4; alternatively a specific meaning can be imparted in the case of bar codes or electro-magnetic waves and instructions on which turns to make can then be memorized.

For example, as shown in FIG. 2, if the air cargo is to be transported to the aircraft parking space mark designated as 16, the auto-running tow vehicle 3, tows the cargo-laden container/pallet dolly 6, detecting and following guide line 4 with a line detecting device (not shown). Sensors 31, 32 detect the branch positions by marks 10, 11, and based upon pre-memorized instructions, auto-running tow vehicle 3 heads toward the aircraft parking space labeled with mark 16.

As described above, since the air cargo needs only to be loaded onto container/pallet dolly 6 before being automatically towed by auto-running tow vehicle 3 to the designated aircraft parking place, container/pallet loader 7, which is waiting in position, can then load the cargo into the aircraft 1 through the loading/unloading cargo door 5 of aircraft 1 to enable the loading of the aircraft with a minimum number of personnel. The operation to unload cargo from aircraft 1 is exactly the same. Auto-running tow vehicle 3 tows container/pallet dolly 6 to the aircraft parking place and stops, whereupon container/pallet loader 7 transfers the air cargo from aircraft 1 to container/pallet dolly 6, and then it is automatically transported to the cargo holding area inside of airport terminal building 2.

Then, for example, should the auto-running tow vehicles $3_2$, $3_3$ meet at the position of marks 14, 15, sound waves or electromagnetic waves emitted from respective transmission sources 33, which are used to detect obstacles ahead, reflect off respective auto-running tow vehicles $3_2$, $3_3$ and are detected by sensors 34, which causes the auto-running tow vehicles to stop at a pre-determined distance from each other. Then, for example, between the two auto-running tow vehicles $3_2$, $3_3$, the one that has waited longer could move out first, or the one that detects the mark 14 along guide line 4 by the right side sensor 31 could have priority to go ahead, or some other rule-based method could be used to continue operations while avoiding accidents such as collisions between the auto-running tow vehicles 3.

Figure 4:
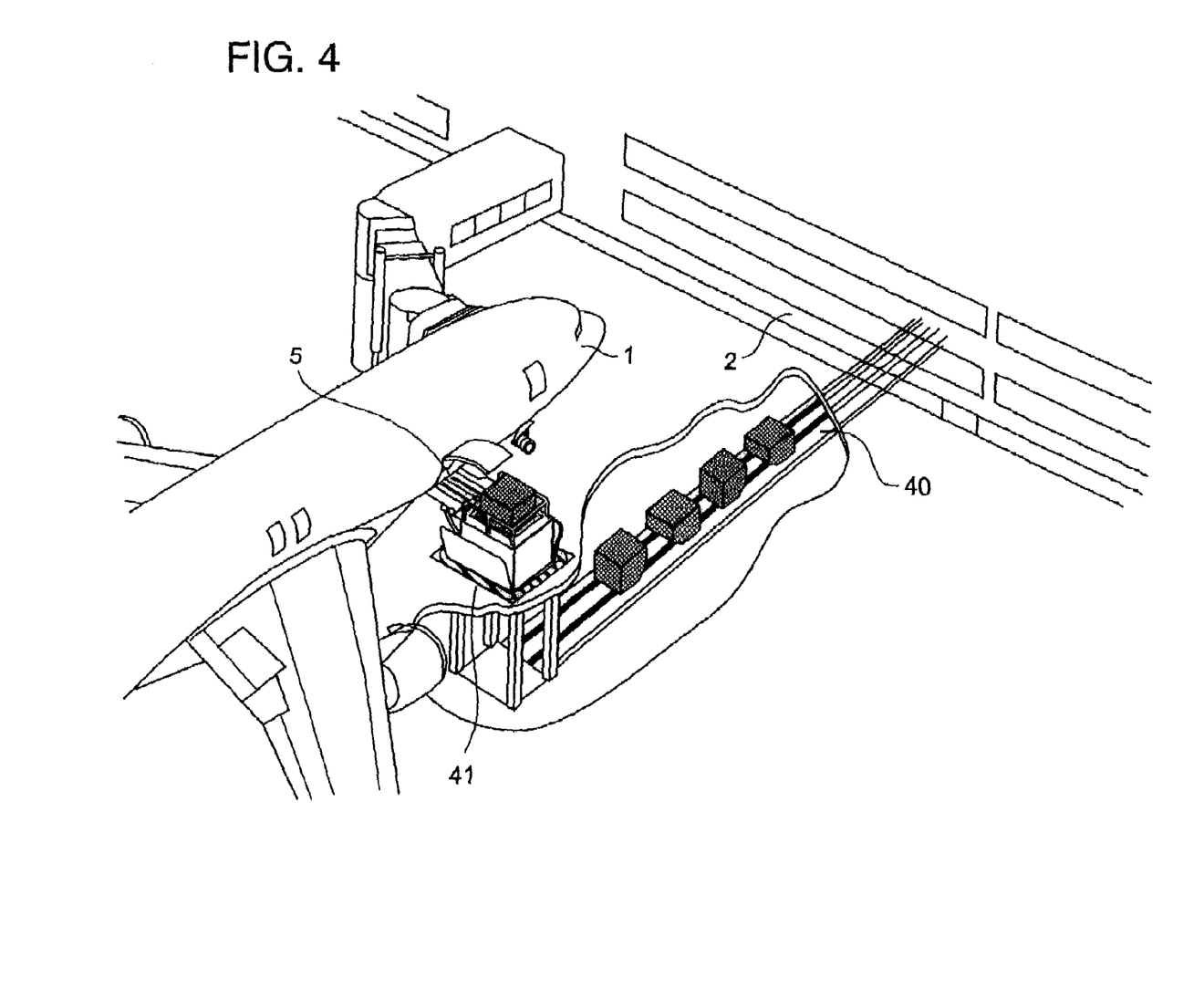
FIG. 4 shows a rough perspective drawing of the second preferred embodiment of this invention.
Figure 5:
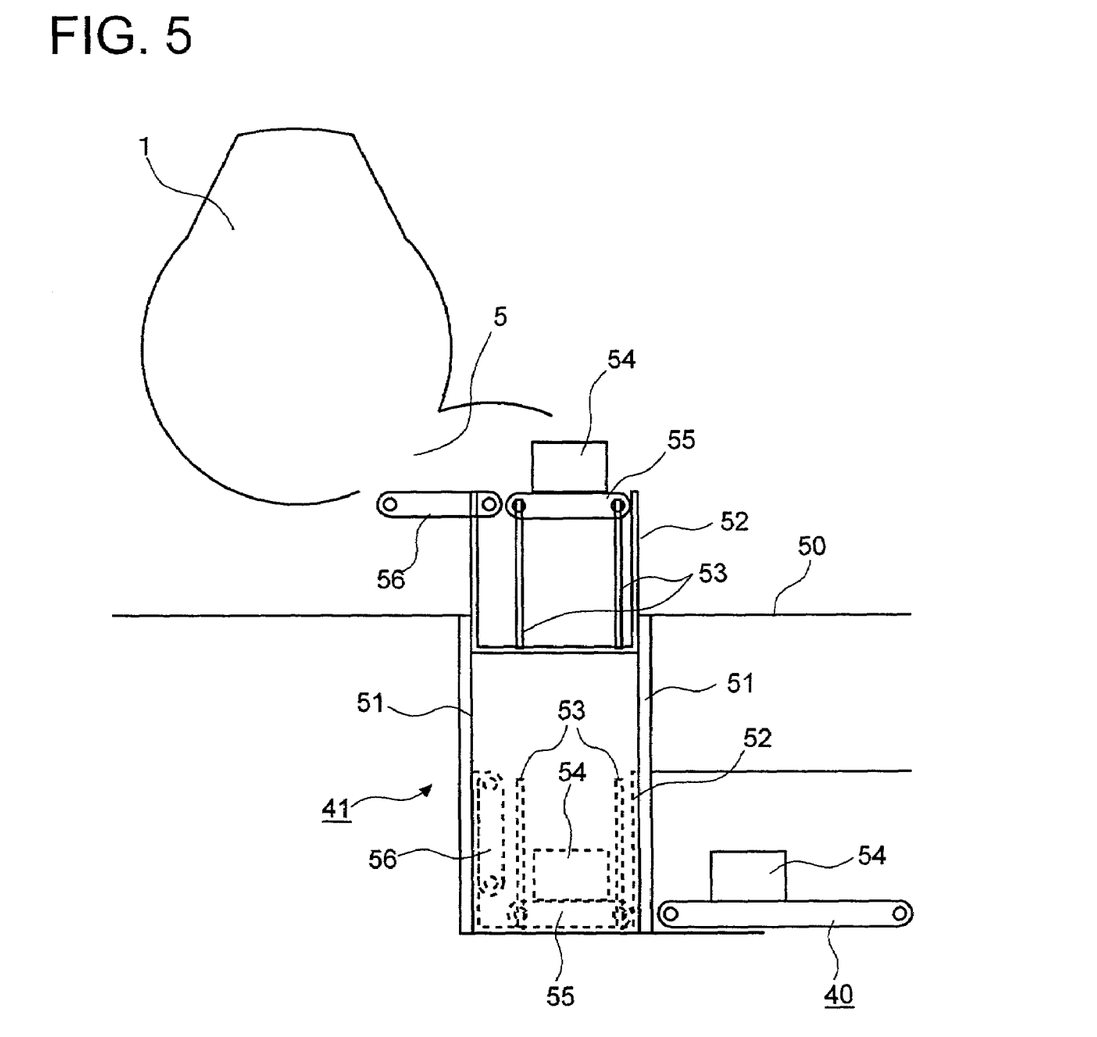
FIG. 5 shows an air cargo elevator according to the second preferred embodiment of this invention.
Figure 6:
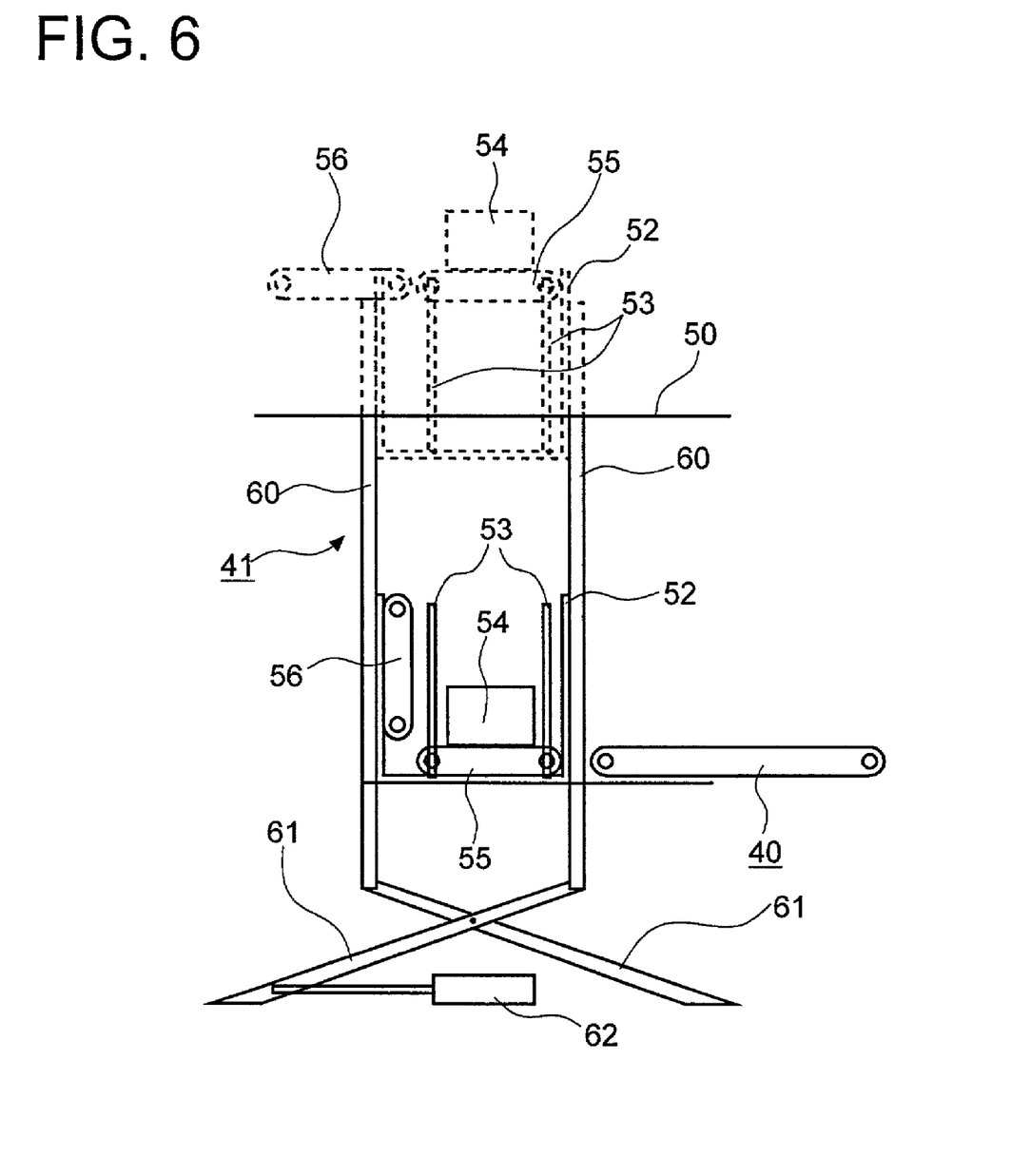
FIG. 6 shows another air cargo elevator according to the second preferred embodiment of this invention.

FIG. 4 shows a rough perspective drawing of the second preferred embodiment of this invention which employs an idea to connect the cargo holding area inside airport terminal building with the aircraft parking area by the foregoing guide lines which are installed underground, FIG. 5 shows an air cargo elevator according to the second preferred embodiment of this invention, FIG. 6 shows another air cargo elevator according to the second preferred embodiment of this invention. In the drawings, 1 is aircraft, 2 is airport terminal, 40 is an underground air cargo conveyor mechanism that connects the cargo holding area inside airport terminal building with the aircraft parking area by the guide lines and a conveyor lines, 41 is an air cargo elevator which connects air cargo conveyor mechanism 40 and the loading/unloading door 5 of the aircraft 1 for air cargo, 50 is ground surface, 51 is support pillar, 52 is elevator compartment, 53 is support pillar, 54 is air cargo, 55 and 56 are conveyors, 60 and 61 are support pillars, and 62 is actuator.

As shown in FIG. 4, the second embodiment comprises: an underground air cargo conveyor mechanism 40 that connects the cargo holding area inside airport terminal building 2 with the aircraft parking area by the foregoing guide lines and a conveyor belt or other type of conveyor line, and air cargo elevators 41, which are positioned at the loading/unloading doors for air cargo in the aircraft parking places to transport the cargo from the underground level to above ground, or from the above ground level to underground. (Although it is not readily apparent from FIG. 4, guide lines 4 according to this invention are also present at the end of the belt conveyor as shown in the foregoing FIG. 1.)

Each air cargo elevator 41, as shown by the diagram in FIG. 5, is comprised of elevator compartment 52, which can ascend or descend by means of a rack and pinion, chain or other mechanism attached to support pillars 51 which is provided beside the air cargo conveyor mechanism 40. Support pillars 53 installed inside elevator compartment 52 include a rack and pinion, chain or other mechanism (not shown) to move conveyor 55 up and down to transfer air cargo 54. Further, the elevator compartment 52, while still below ground level, also houses forward conveyor 56 inside, as shown by the broken lines, and when elevator compartment 52 breaks the surface 50, air cargo 54 is conveyed from conveyor 55 inside air cargo elevator 41 via forward conveyor 56 into the cargo loading/unloading door 5 of aircraft 1.

Then, when air cargo 54 is to be loaded from air cargo conveyor mechanism 40, or when air cargo 54 is to be loaded from elevator compartment 52 onto the air cargo conveyor mechanism 40, elevator compartment 52, as shown by the broken line in FIG. 5, is lowered to its lowest position, and at the same time, conveyor 55 inside elevator compartment 54 also assumes its lowest position. This causes the surface height of conveyor 55 to match that of the conveyor surface of air cargo conveyor mechanism 40, to thereby facilitate the movement of air cargo 54 between the two. Then, for example, if air cargo 54 is to be conveyed into aircraft 1, first the air cargo 54 is transferred from air cargo conveyor mechanism 40 onto conveyor 55 inside elevator compartment 52. Then, elevator compartment 52 is raised by a rack and pinion, chain or other means (not shown) to the height shown by the solid line. At this position, a rack and pinion, chain or other means (not shown) is used to raise conveyor 55 inside of elevator compartment 52 to the position shown by the solid lines, and in addition, forward conveyor 56 deploys to the position shown by the solid lines.

Air cargo 54 is thereby conveyed via conveyors 55, 56 into aircraft 1 via air cargo loading/unloading door 5. Thus, cargo 54 is conveyed from the cargo holding area inside airport terminal building 2 to air cargo loading/unloading door 5 of aircraft 1 completely without human intervention. Accordingly compared with the prior art, the need for drivers for the ramp equipment tractors, cargo 54 handlers, and additional conveyors is eliminated, and further, the danger of accidents such as collisions by ramp equipment tractors, etc. is eliminated, manpower costs are reduced, and cargo loading time is shortened.

The air cargo elevator 41 shown in FIG. 5, was described above as having forward conveyor 56 inside elevator compartment 52, which was used to transfer air cargo 54 when elevator compartment 52 was raised, however this is not an essential means in this invention. Instead of using forward conveyor 56, for example, a container/pallet loader 7 such as shown in FIG. 1 could be used to convey the cargo from air cargo elevator 41 into air cargo loading/unloading door 5 of aircraft 1.

Also, air cargo elevator 41 shown in FIG. 5, was described above as having support pillars 51 extended to the ground surface 50 to raise elevator compartment 52, with elevator compartment 52 being further raisable above the ground surface 50, but this arrangement could impose unreasonable forces on the rack, pinion, chain or other means (not shown) of lifting elevator compartment 52. Accordingly, support pillars 51 could be replaced by support pillars 60, as shown in FIG. 6, which are raised an lowered by support pillars 61 and actuator 62. Thus, by raising elevator compartment 52 to the position of the support pillars 60 shown by the broken lines using this method, it is possible to prevent unreasonable forces from being imparted to any rack and pinion, chain or other lifting mechanism.

Also, air cargo elevator 41 shown in FIG. 5 has air cargo conveyor mechanism 40 positioned at the right hand side of the aircraft in the FIG. 5, but as shown in FIG. 4 in the case where the conveyance direction for air cargo 54 in air cargo conveyor mechanism 40 differs from that of the cargo loading/unloading door of aircraft 1, either a turntable or other means of changing the direction of conveyance could be located at the junction between air cargo conveyor mechanism 40 and air cargo elevator 41, or the conveyor inside of elevator compartment 52 itself could be a turntable or other apparatus that changes the direction of conveyance.

According to this invention, as described above, instead of using ramp equipment tractors which used to be running around the tarmac parking area, this system employs a tow vehicle that can automatically follow and run upon guide lines. As an alternative system, air cargo is conveyed by an underground air cargo conveyor mechanism which links the air cargo holding area in the airport terminal building and the aircraft parking area, and the air cargo is lifted up to the loading/unloading cargo door of the aircraft by an air cargo elevator. This system eliminates the need for human-driven equipment, such as the conventional ramp equipment tractors, to thereby eliminate the possibility of accidents such as collisions, reduce manpower costs, and shorten the time required for loading cargo, and results in other various effects.

The invention claimed is:

1. An air cargo transport system having guide lines which connect an air cargo holding area in an airport terminal building with an aircraft parking area on a tarmac, and a plurality of auto-running tow vehicles for conveying air cargo which can automatically run along the guide lines, comprising:
   a plurality of branch marks at each branch guiding said auto-running tow vehicles to the aircraft parking area; and
   a plurality of stop marks which cause said auto-running tow vehicle to stop at a desired aircraft parking area by reading said stop mark provided along said guide line in order to automatically tow the air cargo from the air cargo holding area in the airport terminal building to the aircraft parking area,
   wherein:
      the plurality of branch marks includes bar code marks, light emitting elements and embedded oscillators, each of said branch marks imparting a specific meaning to guide the plurality of auto-running tow vehicles to turn right or left based upon memorized route instructions,
      each of said plurality of auto-running tow vehicles is configured to have and is controlled by a rule which determines which of said plurality of auto-running tow vehicles should have priority to proceed along said guide lines in order to avoid accidents and collisions between the auto-running tow vehicles when said plurality of auto-running tow vehicles merge in the same direction at a branching point, and said establishing priority is based on which side of sensors provided on both sides of said each of plurality of auto-running tow vehicles detects said branch mark.

2. An air cargo transport system according to claim 1, wherein each of said plurality of auto-running tow vehicles are equipped with a sensor that detects obstacles in front of said vehicle, and said vehicle automatically stops when said obstacle is detected.

3. An air cargo transport system according to claim 1, which has underground conveyor lines including said guide lines that connect the air cargo holding area in the airport with the aircraft parking area, comprising:
   an air cargo conveyor mechanism installed underground; and
   an air cargo elevator which connects said air cargo conveyor mechanism with the ground level to lift or lower the air cargo;
   wherein said air cargo elevator comprises an elevator compartment which ascends and descends from the underground loading/unloading position for said air cargo conveyor mechanism to the ground level, and a loading mechanism which loads the air cargo towards a cargo loading/unloading door of the aircraft to transport the air cargo underground between the cargo holding area in the airport terminal building and the aircraft parking area.

* * * * *